United States Patent
Saleh et al.

(10) Patent No.: US 9,681,411 B1
(45) Date of Patent: Jun. 13, 2017

(54) MULTIPLE-NETWORK REGISTRATION PROCESS

(71) Applicant: Sprint Spectrum L.P., Overland Park, KS (US)

(72) Inventors: Ahmad Saleh, Overland Park, KS (US); Deveshkumar N. Rai, Overland Park, KS (US); Saravana Velusamy, Olathe, KS (US); Jose L. Hernandez, Overland Park, KS (US); Naresh Madineni, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 270 days.

(21) Appl. No.: 14/530,650

(22) Filed: Oct. 31, 2014

(51) Int. Cl.
*H04W 60/00* (2009.01)
*H04W 36/14* (2009.01)
*H04W 60/04* (2009.01)
*H04W 8/26* (2009.01)

(52) U.S. Cl.
CPC .......... *H04W 60/00* (2013.01); *H04W 36/14* (2013.01); *H04W 8/26* (2013.01); *H04W 60/04* (2013.01)

(58) Field of Classification Search
CPC ..... H04W 60/00; H04W 36/14; H04W 60/04; H04W 8/26
See application file for complete search history.

(56) References Cited

U.S. PATENT DOCUMENTS

| | | | |
|---|---|---|---|
| 2012/0028661 A1* | 2/2012 | Fang | H04W 36/0022 455/466 |
| 2012/0314562 A1 | 12/2012 | Zhao et al. | |
| 2013/0329638 A1* | 12/2013 | Ren | H04W 60/005 370/328 |
| 2015/0282011 A1* | 10/2015 | Watfa | H04W 36/0022 370/332 |

* cited by examiner

*Primary Examiner* — Lester Kincaid
*Assistant Examiner* — William Wang (57) ABSTRACT

A method is disclosed to help register a UE with a different network in the event of an unsuccessful registration with a fallback network. In accordance with the disclosure, a UE may be registered on a first network and may then seek to register with a second network via the first network. The first network may attempt to register the UE with the second network, but the attempt to register the UE with the second network may ultimately fail. In response to such failure, the first network may discontinue providing service to the UE. Discontinuing the providing of service to the UE on the first network may result in the UE seeking to register directly with the second network or with a different network. By registering directly with the second network, or a different network, the UE may be able to initiate and/or receive voice calls via that network.

20 Claims, 7 Drawing Sheets

MULTIPLE-NETWORK REGISTRATION PROCESS

BACKGROUND

Unless otherwise indicated herein, the materials described in this section are not prior art to the claims and are not admitted to be prior art by inclusion in this section.

In typical cellular wireless communication systems, wireless communication devices (e.g., cell phones, personal digital assistants, laptops, netbooks, tablets, and/or other wirelessly equipped devices, any of which may be referred to as a user equipment device (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Generally, wireless communications between a given UE and a serving base station in a RAN are carried out in accordance with one or more air interface protocols such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), GSM, GPRS, UMTS, EDGE, iDEN, TDMA, AMPS, MMDS, WIFI, and BLUETOOTH, or others now known or later developed. Through each base station (and corresponding RAN), a UE can obtain connectivity to other networks such as the public switched telephone network (PTSN) and the Internet. In addition to base stations, each RAN may include one or more switches or gateways that provide connectivity with one or more packet-switched networks. Conveniently with this arrangement, a UE that is positioned within coverage of the RAN may communicate with a base station and in turn, via the base station, with other served devices, or with other entities on the packet-switched network.

OVERVIEW

Some wireless communication systems may encompass multiple separate but interconnected networks, such as one network that provides high speed data communications and a separate "fallback" network that provides traditional telephony service. An example of this is a hybrid system that includes an LTE network for data communications and a CDMA network (or GSM network or the like) for legacy telephone service. Hybrid systems such as these generally include functionality to interwork between the networks so as to facilitate "circuit-switched fallback" (CSFB) service.

With such an arrangement, a UE that subscribes to service of such a system may be programmed to operate on the LTE network by default and to then register with the CDMA network by signaling through the LTE network. To facilitate a UE's registration with the CDMA network through the LTE network, an LTE base station may provide to its served UEs operational information about nearby CDMA coverage, such as a reference-cell identifier of a CDMA base station to which UEs may transition to engage in a voice call. Thus, when a UE transmits its CDMA registration request via the LTE network to the CDMA network, the UE may include such specified information in the registration message so that the CDMA network can treat the UE's registration as being analogous to the UE having registered directly via that CDMA base station. This registration message may pass through the LTE network to the CDMA network, which may authenticate the UE and ultimately register the UE for service on the CDMA network. Thereafter, when the UE has a voice call to place, or the CDMA network has a voice call to connect to the UE, call setup signaling may similarly pass between the UE and the CDMA network via the LTE network, at which point the UE may then conveniently switch over to be served by a CDMA base station and to engage in the call.

Unfortunately, however, for various reasons, the CDMA network may refuse or otherwise fail to register the UE for service with the CDMA network. In some cases, the CDMA network may refuse to register the UE because, during the CDMA network's attempt to authenticate the UE, the CDMA network determined that the UE was using an invalid device identifier, and as such, the UE would not be permitted to engage in wireless service with the CDMA network. In other cases, the operational information about nearby CDMA base stations that the LTE base station provided to the UE may be out-of date or otherwise incorrect. These types of errors could, for instance, be a result of human error during provisioning of the LTE base stations with such operational parameters and/or as a result of a system error in automatically provisioning the LTE base stations with operational parameters.

In any case, the CDMA network's refusal to register the UE often happens unbeknownst to the UE. That is, when the CDMA network refuses to register the UE for service, the CDMA network may not pass along to the LTE network any notice to this effect. Or, if the CDMA network does pass along to the LTE network a notification that the CDMA network refused to register the UE, the LTE network may not inform the UE of the unsuccessful registration. In fact, in some cases, the LTE network and/or the CDMA network may even be provisioned to automatically inform the UE of a successful registration on the CDMA network even before the LTE network determines whether or not the UE's registration was successful.

As a result of this, the UE may continue to operate on the LTE network as if the UE were simultaneously registered on the CDMA network and therefore be unable to fall back to the CDMA network to initiate or receive a voice call. This may result in a poor user experience because so long as the UE is not registered on the CDMA fallback network, the UE may not be able to initiate or receive voice calls.

In order to address this situation (and perhaps others), disclosed herein a method and system that may help to register a UE with a different network in the event of an unsuccessful registration with a fallback network. In accordance with the disclosure, a UE may be connected to a first network (e.g., an LTE network) and be receiving service from the first network. The UE may then seek to register with a second network (e.g., a fallback CDMA network) via the first network. In line with the discussion above, the UE may transmit to the first network a request to register with the second network. The first network may responsively pass the registration request through the first network and onto a second network. The second network may attempt to register the UE for service on the second network but ultimately refuses or otherwise fails to do so. Responsively, the second network may transmit a notification of the unsuccessful registration back to the first network, and the first network may discontinue providing service to the UE. Discontinuing the providing of service to the UE on the first network may result in the UE seeking to register directly with the second network, or perhaps a different network altogether. And by registering directly with the second network, or a different network altogether, the UE may be able to initiate and/or receive voice calls (as well as engage in other types of services) on that network.

In some embodiments of the disclosure, the first network may discontinue providing service to the UE by causing the UE to transition from receiving service from the first network to receiving service directly from a different network, such as the second network. The first network may accomplish this by instructing the UE to engage in a handover process. The first network may, for instance, instruct the UE to engage in a handover to a specific network (e.g., the second network), or the first network may instruct the UE to engage in traditional handover functionality in which the UE measures signal strengths of nearby base stations and reports those measurements to the first network. The first network may then select the base station having the best reported measured signal strength and instruct the UE to hand over to this base station.

In other embodiments of the disclosure, the first network may transmit to the UE a notification that registration on the second network was unsuccessful. This may cause the UE to operate in what is known as long-term failure mode, which may cause the UE to disconnect from the first network and attempt to directly register with a different network (e.g., the second network).

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method and system are described herein with reference to the following drawings, wherein like numerals denote like entities.

DETAILED DESCRIPTION

1. Example Communication System Architecture

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more particular entities may, in practice, be carried out by a different set of one or more entities, and perhaps by hardware, firmware, and/or software. For instance, various functions may be carried out by a processor executing instructions stored in data storage or another medium such as a non-transitory machine-readable medium.

As noted above, FIG. 1 is a simplified block diagram of a network arrangement in which an exemplary embodiment of the present method and system can be implemented. The arrangement of FIG. 1 includes by way of example two representative access networks 12, 14, each of which may function to provide UEs, such as UE 10, with air interface coverage and connectivity with one or more transport networks, such as the PSTN and the Internet. As such, each of these networks may include multiple base stations that radiate to provide one or more respective coverage areas defining an air interface over which to exchange control and bearer data with UEs. For simplicity in the arrangement shown, for instance, network 12 includes a representative base station 16 that radiates to provide a coverage area 18; and network 14 includes a representative base station 20 that radiates to provide a coverage area 22.

Figure 1:
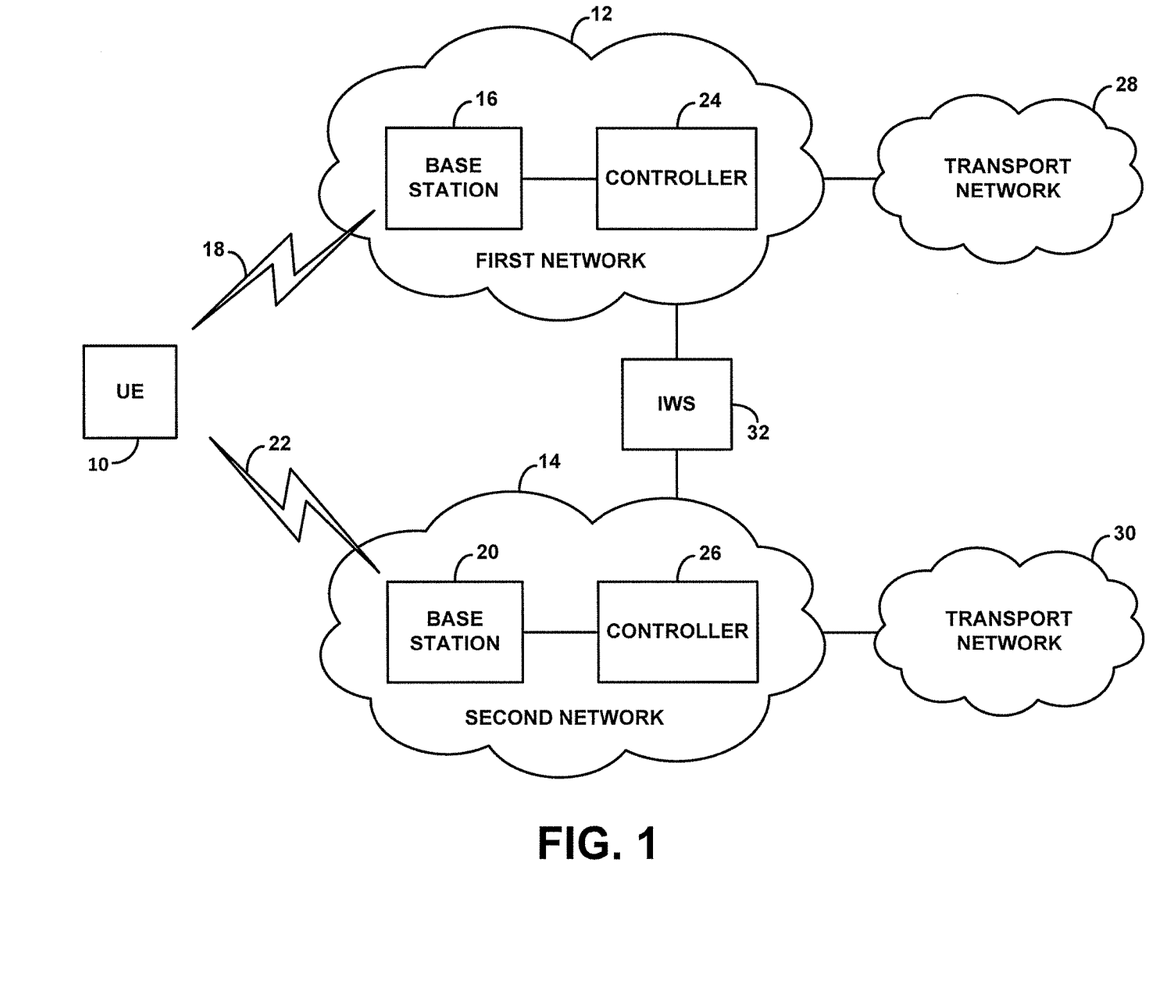
FIG. 1 depicts an example communication system, in which an example embodiment of the described arrangement can be implemented.

Each network may further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network 14 includes a respective controller 26. Network 12 is shown providing connectivity with a representative transport network 28, and network 14 is shown providing connectivity with a representative transport network 30. In an example implementation, transport network 28 might be the Internet, and transport network 30 might be the PSTN; however, other implementations and other example transport networks are possible.

As further shown in FIG. 1, an interworking server (IWS) 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24, 26 and/or other elements of the networks. In the context of the present disclosure, the IWS may function to pass registration request messages or similar setup messages between the networks.

Networks 12 and 14, and IWS 32 may be owned and/or operated by a common wireless service provider that may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a UE 10 is shown positioned in coverage of both network 12 and network 14. When such a UE first powers on or arrives in coverage of network 12, the UE may scan for and detect coverage provided by network 12 and may responsively register with network 12 by transmitting in coverage area 18 to base station 16 a registration request. In response, network 12 (e.g., controller 24) may then record the fact that UE 10 is present within coverage area 18 served by base station 16, so as to facilitate paging UE 10 for calls or other incoming communications. Further, given the association between network 12 and network 14, network 12 may also responsively signal to IWS 32 to trigger registration of UE 10 with network 14. Alternatively, UE 10 may, on its own, request registration on network 14 through network 12. UE 10 may then idle in coverage area 18 of network 12.

When network 14 has a call or other communication to connect or otherwise provide to UE 10, network 14 may then send a page message (or page message trigger) to IWS 32, which IWS 32 may pass along to network 12 to trigger paging of the UE via network 12. Network 12 may then responsively page the UE by having base station 16 transmit a CSFB page message to the UE in coverage area 18. In line with the example CSFB procedures described above, once the UE responds to this CSFB page, the UE may then send a CSFB extended service request message to base station 16 to request setup of the CSFB communication. And likewise, when the UE seeks to place a CSFB call, the UE may establish connectivity with base station 16 and may send a CSFB extended service request message to base station 16 to request setup of that CSFB communication.

Figure 2:
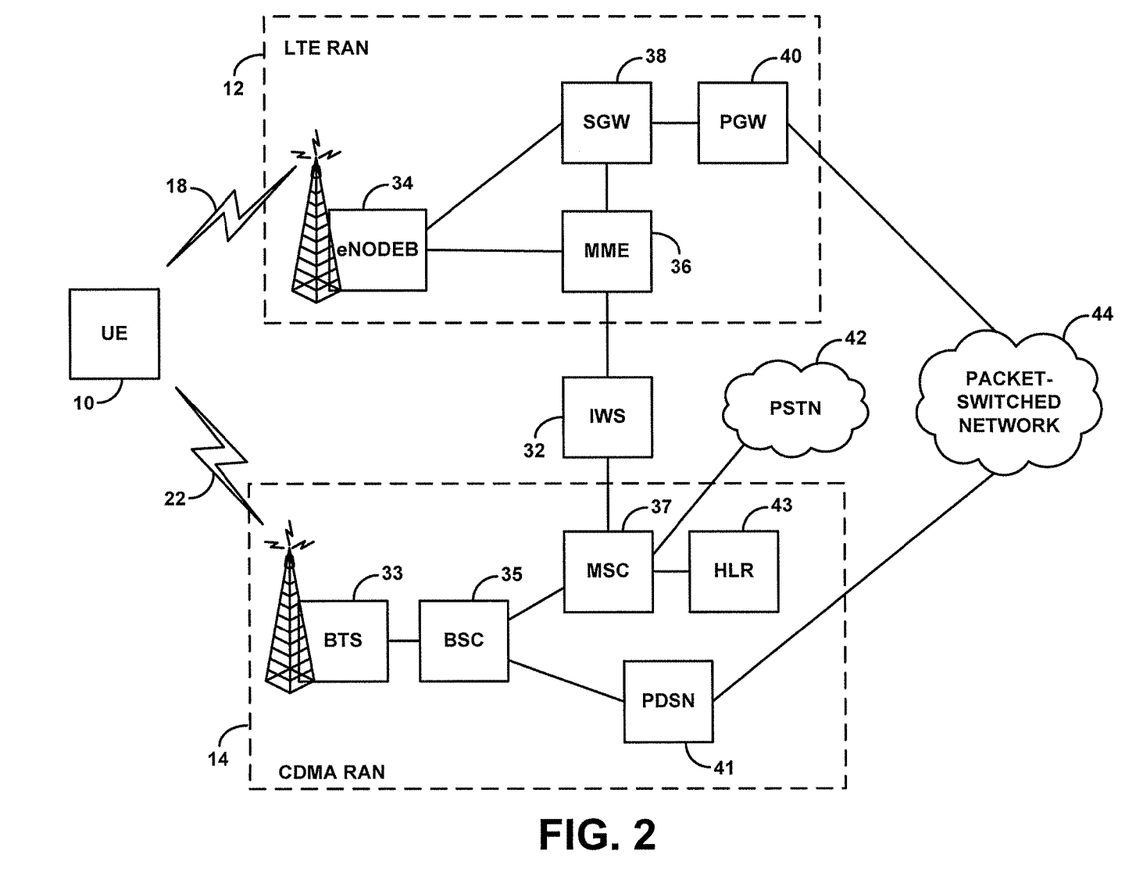
FIG. 2 depicts a more specific example communication system, in which an example embodiment of the described arrangement can be implemented.

FIG. 2 is next a more specific block diagram depicting an example implementation of the network arrangement shown in FIG. 1. In the arrangement of FIG. 2, network 12 is an LTE network that primarily serves UEs with wireless packet data communication service (including perhaps voice-over-packet and other packet-based real-time media service), and network 14 is a CDMA network that primarily serves UEs with traditional cellular voice call service (but may also provide packet-data communication service and other types of service). These networks could take other forms as well, perhaps using the same protocol at each network 12 and 14, or using protocols such as WiMAX, GSM, or others now known or later developed.

The LTE network 12 in this arrangement is shown including a representative LTE base station 34 known as an eNodeB, which includes an antenna structure and associated equipment for engaging in LTE communication over the air interface of coverage area 18 with UEs. The eNodeB 34 is then shown coupled with a mobility management entity (MME) 36 that serves as controller 24 and particularly as a signaling controller for the LTE network. Further, the eNodeB 34 is also shown coupled with a serving gateway (SGW) 38, which may then be coupled with a packet-gateway (PGW) 40 that provides connectivity with a packet-switched network 44. And the MME 36 is shown coupled with the SGW 38. Although the elements of the LTE network 12 are shown with direct connections between them, the elements could be provided as nodes on a core packet network. Thus, the illustrated connections may be logical interfaces between the elements over that network.

The CDMA network 14, on the other hand, is shown including a representative CDMA base station 33 known as a base transceiver station (BTS), which includes an antenna structure and associated equipment for engaging in CDMA communication over the air interface of coverage area 22 with UEs. The BTS 33 is shown in communication with a base station controller (BSC) 35, which in turn is shown in communication with a mobile switching center (MSC) 37 that serves as controller 26 and provides connectivity with the PSTN 42. BSC 35 is also shown in communication with a packet data serving node (PDSN) 41, which provides connectivity with the packet-switched network 44. MSC 37 is shown in communication with a home location register (HLR) 43, which may function to maintain a home profile record of each subscriber UE. In general, for each such UE, the HLR 43 may store a subscriber profile record as well as an indication of where in the wireless communication system the UE is currently operating, such as which base station, switch, or other node is currently serving the UE, to facilitate setup of communications to the UE.

Further shown in FIG. 2 is the IWS 32, which serves as a signaling intermediary between the LTE RAN 12 and the CDMA RAN 14 to facilitate functions such as CSFB. The IWS 32 may be provided as an element of either one of the RANs or as an element separate from but connected to each RAN, for example, as shown in FIG. 2. In one example configuration, IWS 32 may have a communication interface with the MME 36 of the LTE RAN 12 on one hand and a communication interface with the MSC 37 of the CDMA RAN 14 on the other hand. In another example configuration, the IWS 32 may be integrated with the MSC 37 of the CDMA RAN 14. Other arrangements are possible as well.

Although FIGS. 1 and 2 illustrate only one UE, in practice numerous similar UEs may from time to time operate in similar coverage and carry out functions similar to those described herein as being carried out by the representative UE.

2. Example Network Entity

Figure 3:
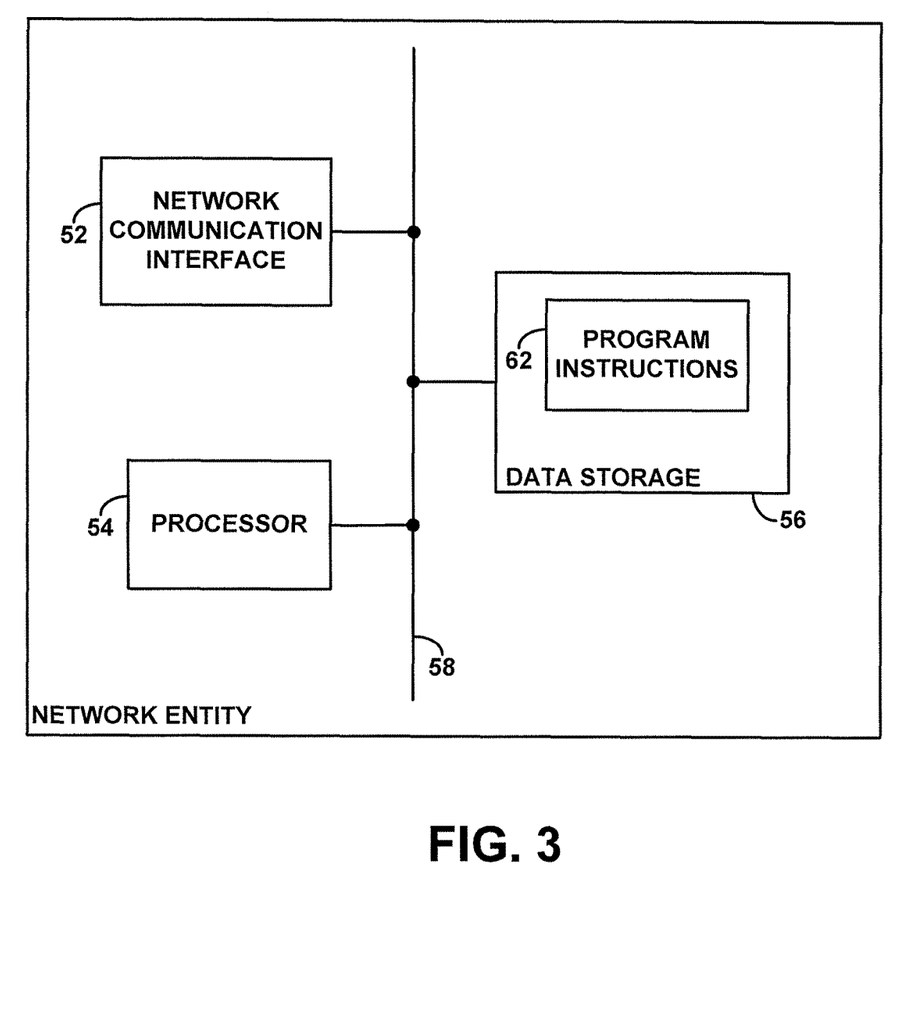
FIG. 3 depicts an example network device arranged to implement the present method.

FIG. 3 is a simplified block diagram of a network entity that may be configured to carry out certain network-side functions described herein. As such, FIG. 3 may represent any of a variety of the network entities shown in FIGS. 1 and 2, for instance MME 36 and/or MSC 37.

As shown in FIG. 3, the network entity may include a network communication interface 52, a processor 54, and data storage 56, all of which may be coupled together by a system bus, network or other connection mechanism 58. Although FIG. 3 depicts these components as discrete blocks, it should be understood that the components can be integrated together or distributed in various ways, and one or more components could be omitted altogether.

More specifically, but still by way of example, network communication interface 52 may generally be any wired (e.g., Ethernet) or wireless (e.g., Wi-Fi) interface over which the network entity can transmit and receive data with another entity. Processor 54 may comprise one or more general purpose processors (e.g., microprocessors) and/or special-purpose processors (e.g., digital signal processors and/or application specific integrated circuits) and may be integrated in whole or in part with the network communication interface 52. Data storage 56 may comprise one or more volatile and/or non-volatile storage components, such as a non-transitory computer-readable medium, and may be integrated in whole or in part with processor 54. Some examples of non-transitory computer-readable media include a hard disk drive, a Compact Disc (CD), a Digital Video Disk (DVD), a digital tape, flash memory, although others are possible. As further shown, data storage 56 may hold program instructions 62, which may be executable by processor 54 to carry out one or more of the various functions described herein.

In one embodiment of the present disclosure, data storage 56 may include program instructions 62 that are executable to cause a first network to provide service to a UE, receive a request to register the UE to receive service from a second network, engage in an attempt to register the UE to receive service from the second network, determine that the attempt to register the UE to receive service from the second network was unsuccessful, and in response to this determination, discontinue the providing of service from the first network to the UE.

3. Example User Equipment

Figure 4:
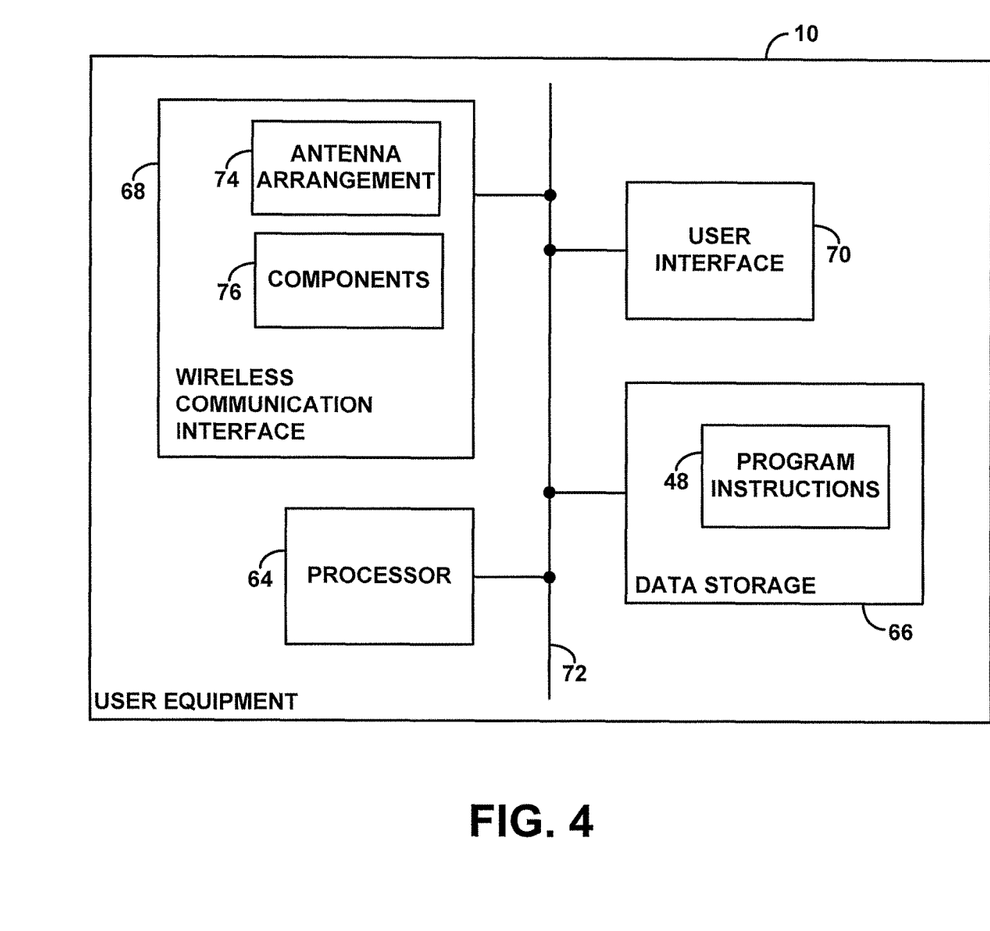
FIG. 4 depicts an example user equipment device arranged to implement the present method.

FIG. 4 is a simplified block diagram of a representative UE 10 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 68, a user interface 70, a processor 64, and data storage 66, all of which may be coupled together by a system bus, network, or other connection mechanism 72.

Wireless communication interface 68 may comprise an antenna arrangement 74 and associated components 76, for engaging in communication with serving base stations, such as to transmit data and control information to the base stations and to receive data and control information from the base stations. For instance, the components 76 may include a mobile station modem, such as an MSM-series chipset. However, other modules that support other protocols are possible as well.

User interface 70 may facilitate interaction with a user of the UE, if applicable. As such, the user interface may include output components such as a display screen, loudspeaker, and headphone jack, and input components such as a keypad, a touch-sensitive screen, and a camera.

Processor 64 may comprise one or more general purpose processors and/or special-purpose processors and may be integrated in whole or in part with wireless communication interface 68. Data storage 66 may comprise one or more volatile and/or non-volatile storage components, such as a non-transitory computer-readable medium, and may be integrated in whole or in part with processor 64. Some examples of non-transitory computer-readable media include a hard disk drive, a Compact Disc (CD), a Digital Video Disk (DVD), a digital tape, flash memory, although others are possible. As shown, data storage 66 may hold program instructions 48, which may be executable by processor 64 to carry out various UE functions described herein.

4. Example Multiple-Network Registration Procedure

In line with the discussion above, when a UE, such as UE 10, is registered for service on a first network (e.g., LTE network 12) in a hybrid wireless communication system that also includes a second network (e.g., CDMA network 14), the UE may register for service on the second network via the first network, so as to enable the UE and the hybrid wireless communication system to engage in CSFB functionality. The first network may facilitate the UE's registration with the second network by providing the UE with operational parameters of the second network. The first network may broadcast these operational parameters to UEs operating in coverage of the first network, or the first network may provide these operational parameters to UEs on a UE-by-UE basis in response to a request from a UE to receive such parameters.

For instance, in an example arrangement in which UE 10 is operating in coverage area 18 of LTE network 12, eNB 34 may periodically broadcast in an LTE "system information block #8" (SIB8) message information about the CDMA fallback network 14, including parameters such as a reference-cell identifier of coverage provided by BTS 33. Alternatively or additionally, eNB 34 may provide this information to UE 10 in response to receiving from the UE a specific request for this information. In any case, once the UE receives the fallback network information, the UE may transmit to LTE network 12 by way of eNB 34 a CSFB registration message. The LTE network 12 may pass this registration message through the LTE network to the CDMA network 14 to register the UE with the CDMA network 14, so that the UE can sometime later seamlessly move over to engage in or receive a call via the CDMA network.

The UE may include in its CSFB registration message certain information that eNB 34 provided as one or more of the CSFB operational parameters, such as the reference-cell identifier of BTS 33, for instance. However, if that information is erroneous, such as if the information specifies an incorrect reference-cell identifier that is not associated with the BTS 33, CDMA network 14 may refuse the requested registration, and thus the UE's CSFB registration would fail.

In some implementations, eNB 34 of LTE network 12, which is serving UE 10, would not learn about this unsuccessful registration. In other implementations, eNB 34 may learn about the unsuccessful registration but may not provide any indication to that effect to UE 10. As a result, UE 10 may continue to operate on LTE network 12 as if UE 10 was registered on the fallback CDMA network 14. As indicated above, however, this may be potentially problematic because if UE 10 is not registered on CDMA network 14, then UE 10 may be unable to fall back to CDMA network 14 to make or receive voice calls on that network.

Figure 5:
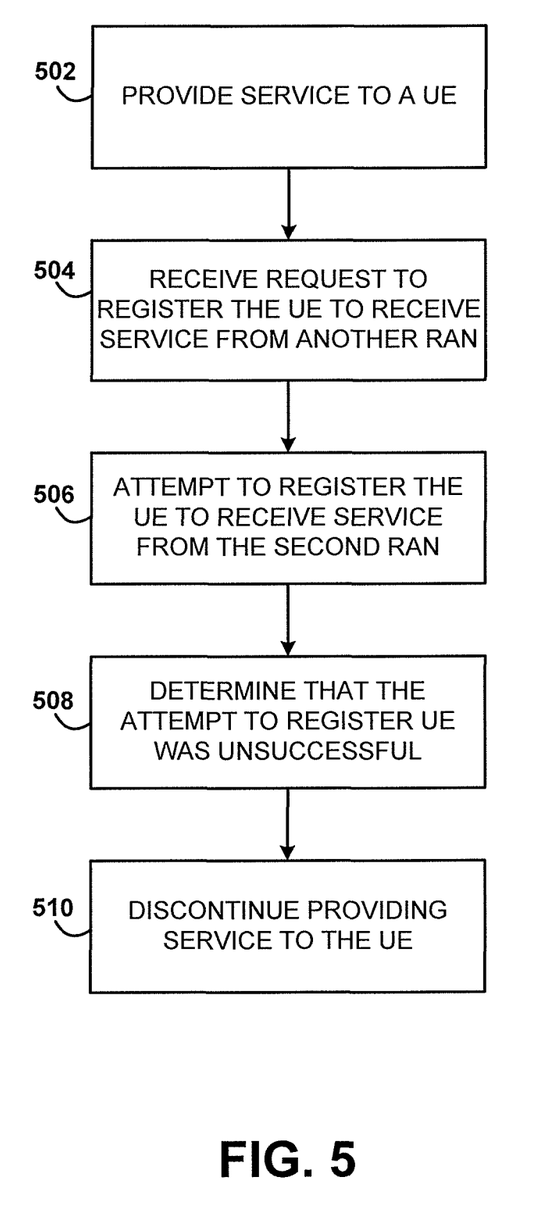
FIG. 5 is a flowchart depicting functions that can be carried out in accordance with the present method.

To address this situation (and perhaps others), disclosed herein is a method that may help to register the UE with a different network in the event of an unsuccessful CSFB registration. FIG. 5 is a flowchart that depicts several example operations that may be carried out in accordance with this method. The operations depicted in FIG. 5 begin at block 502 where a first network provides wireless service to a UE. Consistent with the example arrangements described above, the first network may be an LTE network, such as LTE network 12, but in other arrangements, the first network may be any network utilizing any wireless communication protocol.

At block 504, the first network may receive a request to register the UE to receive service from a second network. Consistent with the example arrangements described above, the second network may be a fallback CDMA network, such as CDMA network 14, but in other arrangements, the second network may be any network utilizing any wireless communication protocol. As will generally be the case, the first network may receive the request to register the UE on the second network from the UE. However, in practice, it may be the case that the first network does not receive a registration request from the UE, but rather the first network may receive a registration request from some other entity, such as a network-side entity on the first or second networks. It may even be the case that the first network does not receive a registration request from any entity; instead, the first network may determine on its own to register the UE to receive service on the second network.

Continuing at block 506, the first network engages in an attempt to register the UE to receive service from the second network. As described above, the first network may pass the registration request though the first network and over to the second network. Generally, procedures for registration of a UE may vary from network to network, depending on the air interface protocol and other factors. But typically, the second network may attempt to register the UE by engaging in various processes to authorize and authenticate the UE, to establish a local service record for the UE, and to record where the UE is located (such as in which coverage area the UE is located).

Continuing at block 508, the first network may determine that the attempt to register the UE at the second network was unsuccessful. As explained above, the second network may refuse to register the UE for any number of reasons, one of which being that the registration request included out-of-date or otherwise inaccurate network identification information. Upon the refusal to register the UE, the second network may transmit a response back to the first network informing the first network that the UE's registration with the second network was unsuccessful.

At block 510, in response to determining that the UE's registration with the second network was unsuccessful, the first network may discontinue providing service to the UE. As explained above, discontinuing the providing of service to the UE from the first network may cause the UE to register directly with a different network (e.g., the second network), thereby enabling the UE to make and receive voice calls via the different network.

Figure 6:
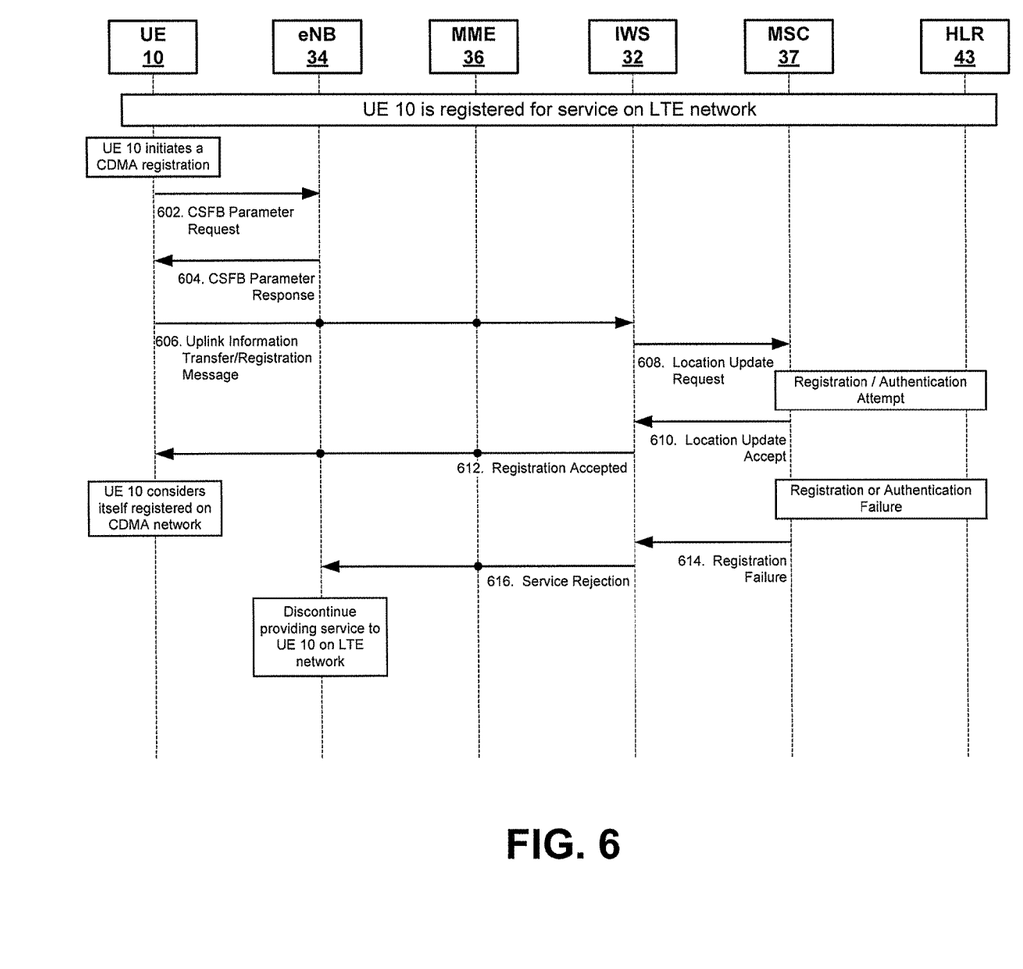
FIG. 6 depicts an example signal-flow diagram, in accordance with an example of the present method.
Figure 7:
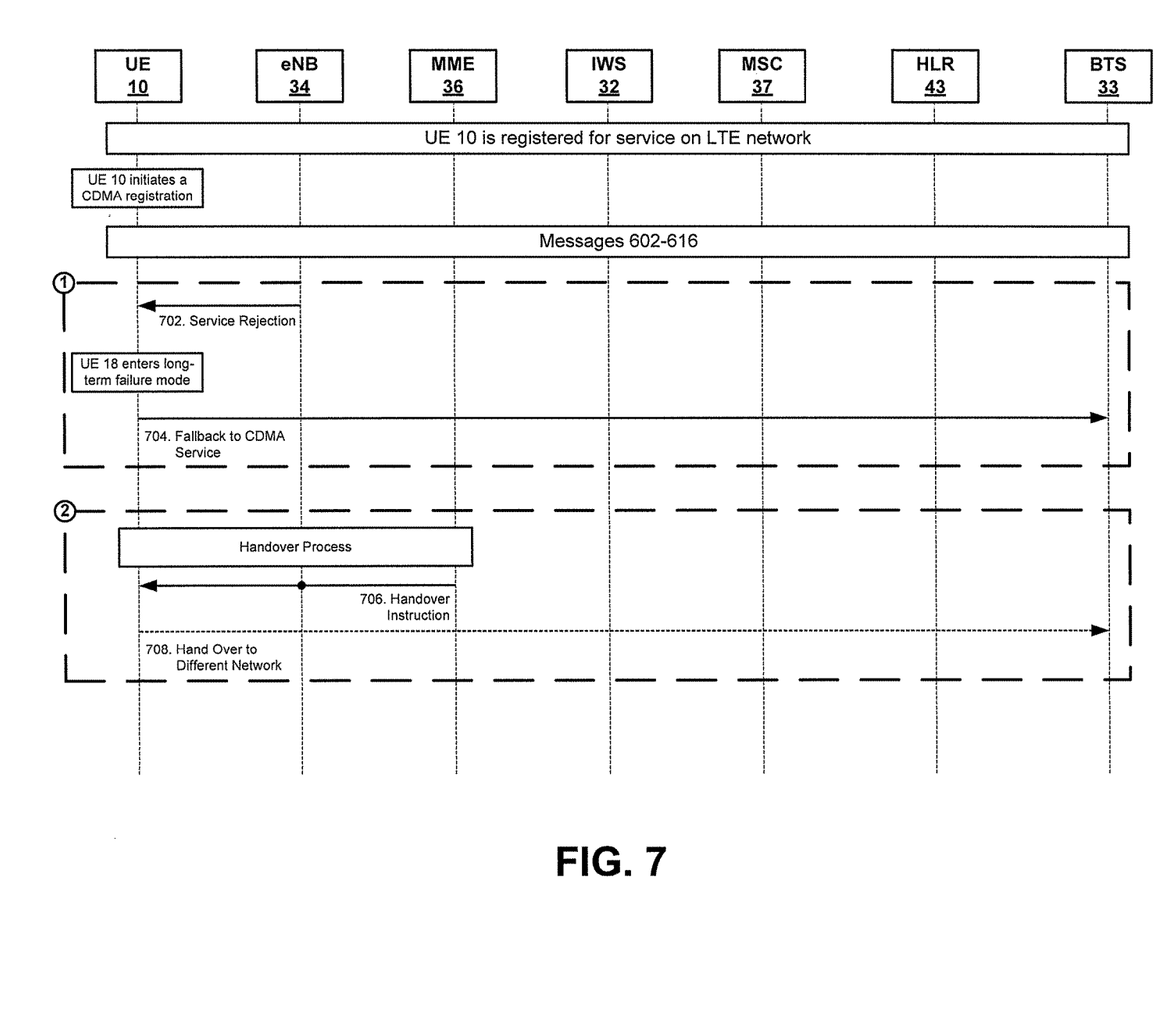
FIG. 7 depicts another example signal-flow diagram, in accordance with an example of the present method.

In order to more fully illustrate the network functionality described above, FIGS. 6 and 7 depict signal-flow diagrams of an example multiple-network registration procedure. The example procedure depicted in FIGS. 6 and 7 involve various signals sent to, from, and between elements of networks 12 and 14, including UE 10, eNB 34, MME 36, IWS 32, MSC 37, HLR 43, and BTS 33. The network elements depicted in FIGS. 6 and 7 may generally correspond to the respective similar network elements described above with respect to FIG. 2. However, it should be understood that the network elements shown in FIGS. 6 and 7 are shown for purposes of example and explanation only, and that additional or alternative network elements may be involved in a multiple-network registration procedure. Further, it should be understood that the particular messages depicted in FIGS. 6 and 7 are set forth for purposes of example and explanation only and that additional and/or alternative messages may be used as well.

Turning first to FIG. 6, UE 10 may initially be registered for service on LTE network 12 and may, for instance, be idling on LTE network 12. While the UE is idling on LTE network 12, the UE may determine to initiate a CDMA registration. UE 10 may determine to initiate a CDMA registration in an effort to enable CSFB functionality; however, UE 10 may initiate a CDMA registration for other reasons as well.

Although not depicted on the signal flow diagram of FIG. 6, UE 10 may initiate the CDMA registration process by first establishing an active connection with the LTE network 12 generally, and eNB 34 specifically. This may begin with the UE sending an RRC Connection Request message to the UE's serving eNB. The RRC Connection Request message may contain a physical identifier of the UE (such as the UE's ESN, MEID, or another type of identifier). In response to receiving the RRC Connection Request message, the eNB sends to the UE an RRC Connection Setup message to indicate that the network recognizes UE and that the network is able to provide network services to the UE. The UE may then send to the eNB an RRC Connection Setup Complete message to acknowledge establishment of the RRC connection.

Once the RRC session is established between the UE and the eNB, the UE may transmit a CSFB Parameter Request message 602 and the eNB 34 may respond with a CSFB Parameter Response message 604. In line with the discussion above, message 604 may contain various operational parameters of the CDMA network 14 that LTE network 12 has determined is available for providing CSFB service to UE 10. By way of example, such operation parameters may include, among other information, an identifier of a network to which UE 10 may fall back to initiate or receive a voice call. For instance, the identifier may take the form of a system identifier (SID) and/or a network identifier (NID) of CDMA network 14 generally, or one or more components of the CDMA network 14 specifically, such as the BTS 33 or the MSC 37. The eNB may be provisioned with these operational parameters by a network engineer or the like, or the eNB may, from time to time, engage in a network update process by which the eNB 34 learns of nearby CDMA fallback networks.

The UE 10 may receive the operational parameters from eNB 34 and may formulate a CSFB registration request message that includes these operational parameters. UE 10 may transmit the registration request message to the eNB 34 in an Uplink Information Transfer/Registration Message 606. The eNB may pass message 606 through MME 36 and onto IWS 32 for forwarding to CDMA network 14. Upon receipt of registration request message 606, IWS 32 may signal to MSC 37 in the form of a Location Update Request message 608. The MSC 37 and HLR 43 may then engage in a registration and authentication process in an attempt to register the UE 10 for service in the CDMA network 14.

As mentioned above, MSC 37 may return a message to the LTE network 12 indicating that the registration was successful even before the registration process is completed. For instance, MSC 37 may return to IWS 32 a Location Update Accept message 610, and IWS 32 may pass this message on to the LTE network 12 in the form of a Registration Accepted message 612. MME 36 may forward this message to eNB 34, and eNB 34 may forward this message to UE 10. And in response to receiving this message, UE 10 may consider that UE 10 is registered on the CDMA network 14. UE 10 may then idle on the LTE network and from time to time continue to engage in LTE communications with the LTE network.

However, back at MSC 37 and HLR 43, the registration and authentication procedure may have been unsuccessful. For instance, the operational parameters included in the UE's registration request message purporting to identify the CDMA network 14, and more particularly identifying MSC 37 and/or BTS 33, may have been out of date or otherwise incorrect. As such, the MSC 37 and HLR 43 may refuse to register the UE 10 for service on the CDMA network 14. Thus, while the UE may still operate on and receive service from the LTE network 12, the UE may be unable to fall back to the CDMA network 14 and initiate or receive voice calls via that network. In response to the unsuccessful registration on the CDMA network 14, MSC 37 may transmit Registration Failure message 614 to IWS 32, and IWS 32 may in turn transmit a Service Rejection message 616 to MME 36, and MME 36 may forward the message to eNB 34.

In accordance with the procedure, eNB 34 may, in response to receiving message 616, discontinue providing service to UE 10 on the LTE network. As indicated above, by discontinuing to provide service to the UE on the LTE network, this may cause the UE to search out and register for service on a different network that may enable the UE to initiate and receive voice calls. The eNB 34 may discontinue to provide service on the LTE network 12 in a number of different ways.

FIG. 7 is a signal-flow diagram depicting two example ways to discontinue providing service to UE 10 on the LTE network. In accordance with a first example, eNB 34 may transmit Service Rejection message 702 to the UE, which may cause the UE to enter what is known as a long-term failure mode. In the long-term failure mode, the UE may detach from the LTE network 12 and transition over to the CDMA network 14 directly. For instance, to accomplish this, the UE 10 may scan for coverage of nearby CDMA networks, and may locate coverage of BTS 33. The UE may then transmit CDMA registration message 704 directly to BTS 33, and BTS 33 may engage in registration and authentication signaling with other components of the CDMA network to register the UE for service on the CDMA network 14.

In accordance with a second example, instead of transmitting the Service Rejection message to the UE, MME 36 and eNB 34 may engage in a handover process with the UE in order to cause the UE to handover to a different network, which may be, perhaps, the CDMA network 14. The process of the UE handing over to a different network may involve handover signaling passing between the LTE network 12 and the different network followed by the UE transitioning to communicate directly over the air with the different network. Alternatively, the process may take other forms, such as the UE transitioning to communicate directly with the different network without handover signaling passing between the LTE network 12 and the different network.

In some embodiments of this second example, MME 36 and/or eNB 34 may transmit to UE 10 an instruction to handover to a particular base station of another network. For instance, the UE may hand over to BTS 33 of CDMA network 14 as indicated on the signal-flow diagram of FIG. 7 as handover message 708. In other embodiments of this example, the MME and eNB may transmit to the UE an instruction to engage in a measurement process by which the UE measures signal strengths of nearby base stations and reports the measurements to the eNB and the MME. The eNB and the MME may then select a suitable base station (e.g., the base station having the greatest signal strength as reported by the UE) and may instruct the UE to hand over to this base station in Handover Instruction 706. Thus, the UE may hand over to a different network, which may be, for instance, the CDMA network 14 as indicated on the signal-flow diagram of FIG. 7 as handover message 708. Alternatively, other ways to discontinue providing service on the LTE network 12 are possible as well.

5. Conclusion

Various embodiments have been described above. Those skilled in the art will understand, however, that changes and modifications may be made to these embodiments without departing from the scope of the claims.

We claim:

1. In a wireless communication system in which a first radio access network (RAN) provides wireless service to user equipment devices (UEs), a method comprising:
    the first RAN providing service to a UE;
    receiving, at the first RAN, a request to register the UE to receive service from a second RAN;
    attempting to register the UE to receive service from the second RAN;
    determining that the attempt to register the UE to receive service from the second RAN was unsuccessful; and
    in response to the determining, discontinuing the providing of service from the first RAN to the UE.

2. The method of claim 1, wherein discontinuing the providing of service from the first RAN to the UE comprises:
    causing the UE to transition from receiving service from the first RAN to receiving service from a different RAN.

3. The method of claim 2, wherein causing the UE to transition from receiving service from the first RAN to receiving service from a different RAN comprises:
    causing the UE to transition from receiving service from the first RAN to receiving service from the second RAN.

4. The method of claim 2, wherein causing the UE to transition from receiving service from the first RAN to receiving service from a different RAN comprises:
    instructing the UE to hand over from the first RAN to the different RAN.

5. The method of claim 2, wherein causing the UE to transition from receiving service from the first RAN to receiving service from a different RAN comprises:
    instructing the UE to engage in a measurement process by which the UE measures signal strengths of base stations of the different RAN and provides to the first RAN a measurement report indicative of the measured signal strengths; and
    in response to receiving the measurement report, instructing the UE to hand over to one of the base stations of the different RAN.

6. The method of claim 1, wherein the first RAN operates according to a different radio access technology than the second RAN.

7. The method of claim 1, further comprising:
    in response to attempting to register the UE to receive service from the second RAN, the first RAN providing to the UE a notification that the registration attempt was successful.

8. The method of claim 7, further comprising:
    in response to determining that the attempt to register the UE to receive service from the second RAN was unsuccessful, the first RAN providing to the UE a second notification that the registration attempt was unsuccessful.

9. The method of claim 8, wherein the notification that the registration attempt was unsuccessful causes the UE to transition from receiving service from the first RAN to receiving service from the different RAN.

10. In a wireless communication system in which a plurality of radio access networks (RANs) are available to provide wireless service to user equipment devices (UEs), the plurality of RANs including a first RAN and a second RAN, a method comprising:
    the first RAN providing service to a UE;
    the first RAN exchanging one or more messages with the second RAN in an attempt to register the UE to receive service from the second RAN;
    the second RAN refusing to register the UE to receive service from the second RAN; and
    in response to the refusing, the first RAN discontinuing the providing of service to the UE.

11. The method of claim 10, wherein the first RAN discontinuing the providing of service to the UE comprises:
    causing the UE to transition from receiving service from the first RAN to receiving service from a different RAN.

12. The method of claim 11, wherein causing the UE to transition from receiving service from the first RAN to receiving service from a different RAN comprises:
    causing the UE to transition from receiving service from the first RAN to receiving service from the second RAN.

13. The method of claim 11, further comprising the second RAN providing service to the UE.

14. A first radio access network (RAN) configured to provide wireless service to user equipment devices (UEs), the first RAN comprising:
- at least one RAN entity that include a non-transitory computer readable medium (CRM), at least one processor, and instructions stored on the CRM and executable by the at least one processor for carrying out operations including:
  - providing service to a UE;
  - receiving a request to register the UE to receive service from a second RAN;
  - attempting to register the UE to receive service from the second RAN;
  - determining that the attempt to register the UE to receive service from the second RAN was unsuccessful; and
  - in response to the determining, discontinuing the providing of service from the first RAN to the UE.

15. The RAN of claim 14, wherein discontinuing the providing of service from the first RAN to the UE comprises:
- causing the UE to transition from receiving service from the first RAN to receiving service from a different RAN.

16. The RAN of claim 15, wherein causing the UE to transition from receiving service from the first RAN to receiving service from a different RAN comprises:
- causing the UE to transition from receiving service from the first RAN to receiving service from the second RAN.

17. The RAN of claim 15, wherein causing the UE to transition from receiving service from the first RAN to receiving service from a different RAN comprises:
- instructing the UE to hand over from the first RAN to the different RAN.

18. The RAN of claim 14, wherein the first RAN is configured to operate according to a different radio access technology than the second RAN.

19. The RAN of claim 14, wherein the operations further comprise:
- in response to attempting to register the UE to receive service from the second RAN, the first RAN providing to the UE a notification that the registration attempt was successful.

20. The RAN of claim 19, wherein the operations further comprise:
- in response to determining that the attempt to register the UE to receive service from the second RAN was unsuccessful, the first RAN providing to the UE a second notification that the registration attempt was unsuccessful.

* * * * *